(12) United States Patent
Yanaka

(10) Patent No.: US 6,904,345 B2
(45) Date of Patent: Jun. 7, 2005

(54) DEVICE AND METHOD FOR OPERATING A VEHICLE

(75) Inventor: Akihiro Yanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 353 days.

(21) Appl. No.: 10/232,407

(22) Filed: Sep. 3, 2002

(65) Prior Publication Data

US 2003/0055538 A1 Mar. 20, 2003

(30) Foreign Application Priority Data

Sep. 14, 2001 (JP) ........................................ 2001-279352

(51) Int. Cl.⁷ .............................................. G06F 19/00
(52) U.S. Cl. ............................ 701/41; 701/1; 180/333; 180/79.1; 180/165; 180/218
(58) Field of Search ................................. 701/1, 36, 41, 701/49; 180/333, 79.1, 165, 218, 65.8, 907

(56) References Cited

U.S. PATENT DOCUMENTS

| | | | | |
|---|---|---|---|---|
| 4,924,960 A | * | 5/1990 | Crill ............................ | 180/333 |
| 5,448,479 A | * | 9/1995 | Kemner et al. ................ | 701/23 |
| 5,971,091 A | * | 10/1999 | Kamen et al. ............... | 180/218 |
| 6,095,944 A | | 8/2000 | Buchanan et al. | |

FOREIGN PATENT DOCUMENTS

| | | |
|---|---|---|
| DE | 196 25 502 C1 | 6/1996 |
| DE | 196 39 849 C1 | 9/1996 |
| DE | 198 47 357 A1 | 10/1998 |
| DE | 199 51 379 A1 | 10/1999 |
| JP | A 8-34353 | 2/1996 |
| JP | 8-142873 | 6/1996 |
| JP | A 8-175219 | 7/1996 |
| JP | A 10-236329 | 9/1998 |
| JP | A 2000-280926 | 10/2000 |
| WO | WO 88/09279 | 12/1988 |

* cited by examiner

Primary Examiner—Thomas G. Black
Assistant Examiner—Ronnie Mancho
(74) Attorney, Agent, or Firm—Oliff & Berridge, PLC

(57) ABSTRACT

A device and method for operating a vehicle having an operating member that is displaceable with respect to a vehicle body and operated by a driver, controls an acceleration of the vehicle according to a displacement position of the operating member, displaces the operating member to a predetermined initial position when electric power starts to be supplied, and prohibits acceleration of the vehicle according to a displacement position of the operating member when the operating member is being displaced to the initial position until the operating member reaches a position which does not instruct the vehicle to accelerate. With this type of device for operating a vehicle, it is possible to prevent the vehicle from moving against the wishes of the driver at the start of operation.

24 Claims, 9 Drawing Sheets

DEVICE AND METHOD FOR OPERATING A VEHICLE

INCORPORATION BY REFERENCE

The disclosure of Japanese patent application no. 2001-279352 filed on Sep. 14, 2001, including the specification, drawings and abstract is incorporated herein by reference in its entirety.

BACKGROUND OF THE INVENTION

1. Field of Invention

The invention relates to a device and method for operating a vehicle according to an operation by a driver of an operating member which is able to be displaced with respect to a vehicle body.

2. Description of Related Art

A device for operating a vehicle, which is provided with an operating lever supported so as to be able to be displaced (tilted) with respect to the vehicle body, in which the vehicle is steered and accelerated according to a displacement position of the operating lever operated by the driver has been known. An example of this type of art is disclosed in Japanese Patent Application Laid-Open Publication No. 8-142873 and Japanese Patent Application Laid-Open Publication No. 8-34353. This type of device for operating a vehicle has also been provided with an electric motor that is able to displace the operating lever by rotation, and resistance force has been applied by operation of the electric motor against the operation of the operating lever by the driver.

With this related art, however, operation of the vehicle in accordance with an operation of the operating lever when starting to operate the vehicle is not taken into consideration. As a result, when the vehicle is accelerated according to a displacement position of the operating lever, if the operating lever is in a position for accelerating the vehicle at the start of operation, it is possible that the vehicle may take off against the wishes of the driver immediately after the ignition switch is turned ON, for example. Also, when an electric motor is provided to apply a reaction force as described above, a rotation sensor (normally referred to as an encoder) is provided for detecting a rotation of the electric motor and outputting a rotation signal indicative of that rotation. However, because this rotation sensor only detects the rotation of the electric motor and outputs a rotation signal, it was not possible to accurately detect an abnormality of the rotation sensor, including an abnormality or the like of this rotation signal.

SUMMARY OF THE INVENTION

An aspect of the invention thus provides a device for operating a vehicle which will eliminate the possibility of the vehicle taking off against the wishes of the driver no matter what position the operating lever is in when operation starts.

In order to achieve the foregoing, a device for operating a vehicle is provided with an operating member that is displaceable with respect to the vehicle and operated by a driver to cause the vehicle to move and a controller that controls an acceleration of the vehicle according to a displacement position of the operating member. The controller further causes the operating member to be displaced to a predetermined initial position when electric power starts to be supplied thereto, and prohibits acceleration of the vehicle according to a displacement position of the operating member while the operating member is being displaced to the initial position until the operating member reaches a position which does not instruct the vehicle to accelerate.

In this case, the determination of whether the operating member has reached a position which does not instruct the vehicle to accelerate can be made using the controller for detecting the displacement position of the operating member. Also, instead of detecting the position, time may be measured from when power starts to be supplied or from the start of displacement by the controller, and the operating member may be considered to be in a position which does not instruct the vehicle to accelerate when that measured time exceeds a predetermined time, i.e., when a predetermined time has passed from when power started to be supplied or from the start of displacement by the operation controller. Further, in a system in which the time required for an initial process of the system, such as the time required for abnormality detection (confirmation of normal functioning) of various sensors and the time required for initial setting of a computer device or the like, is longer than the time required for the operating member to reach, using the controller, a position which does not instruct the vehicle to accelerate, the operating member may be considered to have reached a position which does not instruct the vehicle to accelerate after the time required for the initial process has passed.

Accordingly, when electric power is supplied, the controller returns the operating member to a predetermined initial position. Also, acceleration of the vehicle according to the displacement position of the operating member is prohibited by the controller until the operating member reaches a position which does not instruct the vehicle to accelerate. Therefore, when the driver starts to operate the vehicle using the operating member, the operating member is always operated from the predetermined initial position, such that unintentional acceleration, i.e., unintentional take off, of the vehicle is able to be prevented. As a result, no matter what displacement position the operating member is in before the vehicle is operated, operation of the vehicle that is unintended by the driver is able to be prevented and vehicle safety is improved.

Also, to achieve the foregoing, a device for operating a vehicle is provided that has the same type of operating member and a controller as described above, which also prohibits acceleration of the vehicle according to a displacement position of the operating member when electric power starts to be supplied thereto until the operating member reaches a position which does not instruct the vehicle to accelerate.

In this case as well, the determination of whether the operating member has reached a position which does not instruct the vehicle to accelerate can be made using the controller for detecting the displacement position of the operating member. Also, instead of detecting the position, the operating member may be considered to be in a position which does not instruct the vehicle to accelerate when a predetermined time has passed from when power started to be supplied or from the start of displacement by the controller, as described above.

Accordingly, when electric power is supplied, acceleration of the vehicle according to the displacement position of the operating member is prohibited by the controller until the operating member reaches a position which does not instruct the vehicle to accelerate. Therefore, during the time that the operating member is being returned to the initial position either manually or automatically, acceleration, i.e., take off, that is unintended by the driver is able to be prevented. As a result, no matter what displacement position the operating member is in before the vehicle is operated, operation of the vehicle unintended by the driver is able to be prevented and vehicle safety is improved.

Moreover, to achieve the foregoing, a device for operating a vehicle provided with an operating member that is displaceable in a first direction and in a second direction with respect to the vehicle and operated by a driver, a first position sensor that detects a displacement position of the operating member in the first direction, a second position sensor that detects a displacement position of the operating member in the second direction, and a controller. The controller accelerates the vehicle according to a displacement position of the operating member in the first direction, detected by the first position sensor, steers a steered wheel according to the displacement position of the operating member in the second direction, detected by the second position sensor, determines whether the displacement positions of the operating member in the first and second directions, detected by the first position sensor and the second position sensor, respectively, are respective predetermined initial positions, and prohibits acceleration of the vehicle according to a displacement position of the operating member in the first direction by the operation controller until it is determined that the displacement positions of the operating member in the first and second directions are the respective predetermined initial positions.

According to this exemplary embodiment, acceleration of the vehicle according to a displacement position of the operating member is prohibited unless the operating member has been returned to the predetermined initial position either by an operation by the driver or automatically. Therefore, when the driver starts to operate the vehicle using the operating member, the operating member is always operated from the predetermined initial position, such that operation of the vehicle which is unintended by the driver is able to be prevented, thus improving vehicle safety.

In this case, in particular, the predetermined initial position of the operating member may be a position corresponding to a steering angle of the steered wheel in the second direction. Accordingly, the driver starts to operate the operating member from a displacement position which has been made to correspond to the steering angle of the steered wheel so it is possible to steer the steered wheel. This enables the driver to more accurately steer the steered wheel and thus ensures vehicle safety.

Moreover, to achieve the foregoing, a device for operating a vehicle provided with an operating member that is displaceable in a first direction and in a second direction with respect to the vehicle and operated by a driver, a first position sensor that detects a displacement position of the operating member in the first direction, a second position sensor that detects a displacement position of the operating member in the second direction, and a controller. The operation controller accelerates the vehicle according to a displacement position of the operating member in the first direction, detected by the first position sensor, steers a steered wheel according to a displacement position of the operating member in the second direction, detected by the second position sensor, displaces the operating member to a predetermined initial position when the vehicle starts to be operated, and prohibits acceleration of the vehicle according to a displacement position of the operating member in the first direction by the controller until displacement of the operating member by the controller is complete.

Accordingly to this exemplary embodiment, acceleration of the vehicle according to a displacement position of the operating member is prohibited unless the operating member has been returned automatically to the predetermined initial position. Therefore, when the driver starts to operate the vehicle using the operating member, the operating member is always operated from the predetermined initial position, such that operation of the vehicle which is unintended by the driver is able to be prevented, thus improving vehicle safety.

In this case, in particular, the predetermined initial position of the operating member may be a position corresponding to a steering angle of the steered wheel in the second direction. Accordingly, the driver starts to operate the operating member from a displacement position which has been made to correspond to the steering angle of the steered wheel so it is possible to steer the steered wheel. This enables the driver to more accurately steer the steered wheel and thus ensures vehicle safety.

Further, in this case, the operating member may be an operating lever in the shape of a joystick that is rotatably supported by the vehicle body. In particular, this operating lever may also be attached to the vehicle body so as to be able to rotate forward, backward, and left and right. The rotational position in the forward-backward and left-right directions may be detected by position sensors (or the first and second position sensors), and the vehicle may be operated in accordance with that detected rotational position. For example, the vehicle may be braked (or accelerated) according to a displacement of the operating lever from a neutral position forward, while the vehicle may be accelerated (or braked) according to a displacement of the operating lever backward, and the steered wheel may be turned to the left and right according to displacement of the operating lever from the neutral position to the left and right, respectively.

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

In the following description and the accompanying drawings, the invention will be described in more detail in terms of exemplary embodiments.

Figure 1:
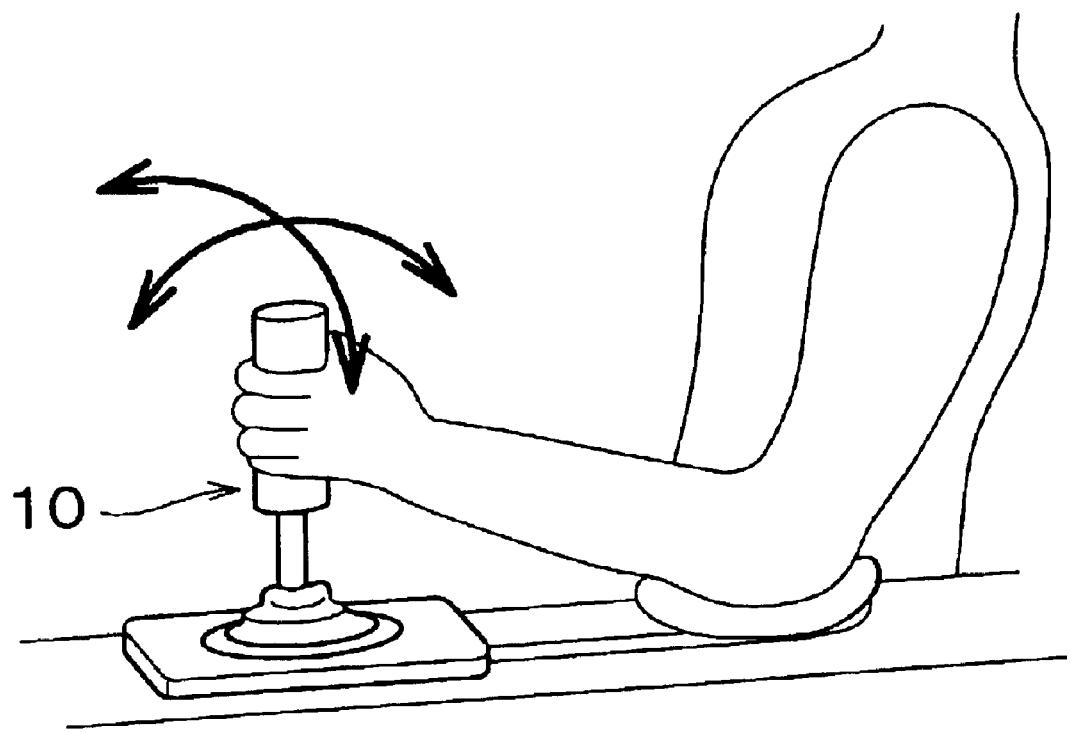
FIG. 1 is a schematic view of an operating lever of a device for operating a vehicle according to an exemplary embodiment of the invention.
Figure 2:
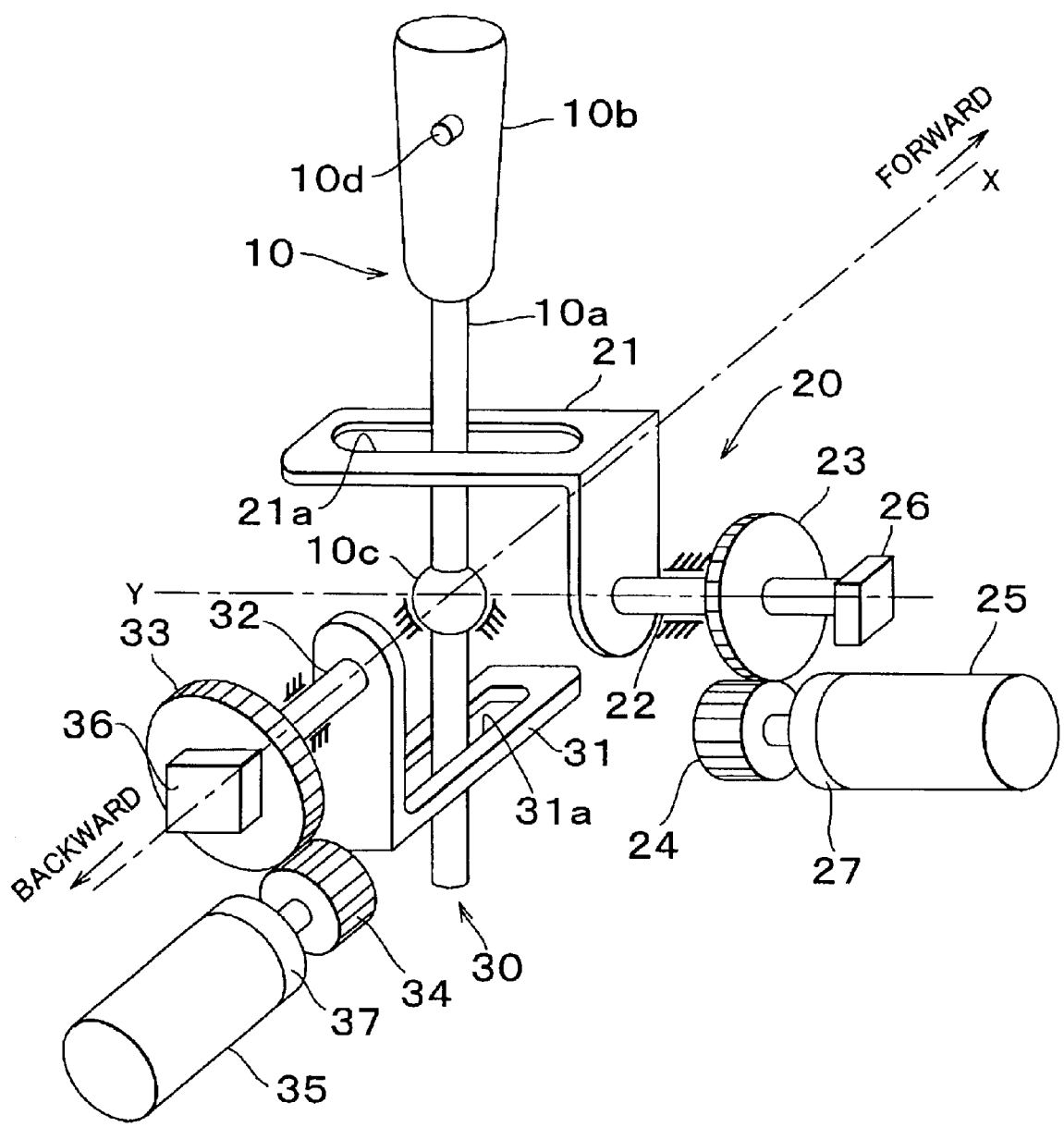
FIG. 2 is a perspective view schematically showing an operating lever device according to the exemplary embodiment of the invention.

This device for operating a vehicle includes an operating lever (joystick) 10 which serves as an operating member, as shown in FIG. 1 and FIG. 2. The operating lever 10 is disposed near the driver's seat in the vehicle and is able to tilt (rotate) as a whole unit in a forward-backward direction (direction X) and a left-right direction (direction Y) with respect to the vehicle body, as shown by the arrows in FIG. 1.

FIG. 2 shows a schematic perspective view of an operating lever device which includes the operating lever 10. The operating lever 10 includes a rod 10a and a cylindrical gripping portion 10b that is fixed to the outer periphery of an upper portion of the rod 10a. The rod 10a includes a ball shaped portion 10c and is rotatably supported by this ball shaped portion 10c in the left-right and forward-backward directions with respect to the vehicle body. When the axial direction of the rod 10a is perpendicular, the rotational position of the operating lever 10 is defined as a neutral position in which it is in a center position with respect to the directions of rotation of the operating lever 10. Also, on the gripping portion 10b is provided a hold release button 10d to release the vehicle from a stopped state (immobile state) and allow it to take off.

Further, the operating lever device also includes a forward-backward reaction force generating mechanism 20 which generates a reaction force against the tilt of the operating lever 10 in the forward-backward direction (direction X) with respect to the vehicle body (i.e., an opposing force against the operating force applied by the driver as the driver attempts to tilt the operating lever 10 in the forward-backward direction (from the neutral position) with respect to the vehicle body). This forward-backward reaction force generating mechanism 20 is provided with a guide plate 21, a rotation shaft 22, a first gear 23, a second gear 24, and an electric motor (a motor for applying forward-backward reaction force) 25.

The guide plate 21 is a plate-shaped member that is curved into an L shape. One face of the guide plate 21 lies in a vertical plane. To this face is fixed one end of the rotation shaft 22. The other face of the guide plate 21 lies in a horizontal plane. In this face is provided a groove 21a which has a width slightly larger than the diameter of the rod 10a and which extends lengthwise in the left-right direction with respect to the vehicle body. The rod 10a sticks through this groove 21a. The rotation shaft 22 is rotatably supported with respect to the vehicle body such that the axial line of the rotation shaft 22 lies in the left-right direction of the vehicle body and runs through the center of the ball shaped portion 10c of the operating lever 10. Integrally provided on the center portion of the rotation shaft 22 is the first gear 23, which is meshed with the second gear 24 that is fixed to a rotation shaft of the electric motor 25.

According to this construction, the operating lever 10 is rotatably supported in the forward-backward direction (direction X) with respect to the vehicle body. Moreover, rotation of the electric motor electric motor 25 (torque generated by the electric motor 25) is used to rotate the rotation shaft 22, which in turn causes the guide plate 21 to rotate around the rotation shaft 22, thereby enabling the operating lever 10 to tilt in the forward-backward direction.

A displacement amount sensor 26 is fixed to the vehicle body at the other end of the rotation shaft 22. The displacement amount sensor 26 is constructed as a rotation angle sensor, and detects a rotation angle of the rotation shaft 22 as a displacement amount Xn in the forward-backward direction of the operating lever 10. When the operating lever 10 is in the neutral position in the forward-backward direction, the displacement amount Xn is "0". The output of the displacement amount sensor 26 is adjusted such that following displacement in the forward direction, the displacement amount Xn decreases negatively (an absolute value of the negative value increases), and following displacement backward, the displacement amount Xn increases positively. Also, an encoder 27 used to control the rotation of the electric motor 25 is attached to the electric motor 25. This encoder 27 detects the rotation of the rotation shaft of the electric motor 25 and outputs a rotation signal indicative of that rotation. More specifically, the encoder 27 outputs a rotation signal that includes a two phase signal of consecutively generated pulses that repeats low and high levels alternately at least each time the rotation shaft rotates just a predetermined angle. Because it is possible to detect the direction of rotation of the electric motor 25, each phase of the two phase signal of consecutively generated pulses is only off by $\pi/2$.

Further, the operating lever device also includes a left-right reaction force generating mechanism 30 which generates a reaction force against the tilt of the operating lever 10 in the left-right direction (direction Y) with respect to the vehicle body (an opposing force against the operating force applied by the driver as the driver attempts to tilt the operating lever 10 in the left-right direction from the neutral position with respect to the vehicle body). This left-right reaction force generating mechanism 30 is provided with a guide plate 31, a rotation shaft 32, a third gear 33, a fourth gear 34, and an electric motor (a motor for applying left and right reaction force) 35.

The guide plate 31 is a plate-shaped member that is curved into an L shape. One face of the guide plate 31 lies in a vertical plane. To this face is fixed one end of the rotation shaft 32. The other face of the guide plate 31 lies in a horizontal plane. In this face is provided a groove 31a which has a width slightly larger than the diameter of the rod 10a and which extends lengthwise in the forward-backward direction with respect to the vehicle body. The rod 10a sticks through this groove 31a. The rotation shaft 32 is rotatably supported with respect to the vehicle body such that its axial line lies in the forward-backward direction of the vehicle body and runs through the center of the ball shaped portion 10c of the operating lever 10. Integrally provided on the center portion of the rotation shaft 32 is the third gear 33, which is meshed with the fourth gear 34 that is fixed to a rotation shaft of the electric motor 35.

According to this construction, the operating lever 10 is rotatably supported in the left-right direction (direction Y) with respect to the vehicle body. Moreover, rotation of the electric motor 35 (torque generated by the electric motor 35) is used to rotate the rotation shaft 32, which in turn causes the guide plate 31 to rotate around the rotation shaft 32, thereby enabling the operating lever 10 to tilt in the left-right direction.

A displacement amount sensor 36 is fixed to the vehicle body at the other end of the rotation shaft 32. The displacement amount sensor 36 is constructed as a rotation angle sensor, and detects a rotation angle of the rotation shaft 32 as a displacement amount Yn in the left-right direction of the operating lever 10. When the operating lever 10 is in the neutral position in the left-right direction, the displacement amount Yn is "0". The output of the displacement amount sensor 36 is adjusted such that following displacement to the right, the displacement amount Yn increases positively, and following displacement to the left, the displacement amount Yn decreases negatively (an absolute value of the negative value increases). Also, an encoder 37 used to control the rotation of the electric motor 35 is attached to the electric motor 35. This encoder 37 detects the rotation of the rotation shaft of the electric motor 35 and outputs a rotation signal indicative of that rotation. More specifically, the encoder 37 outputs a rotation signal that includes a two phase signal of consecutively generated pulses that repeats low and high levels alternately at least each time the rotation shaft rotates just a predetermined angle. Because it is possible to detect the direction of rotation of the electric motor 35, each phase of the two phase signal of consecutively generated pulses is only off by $\pi/2$.

Figure 3:
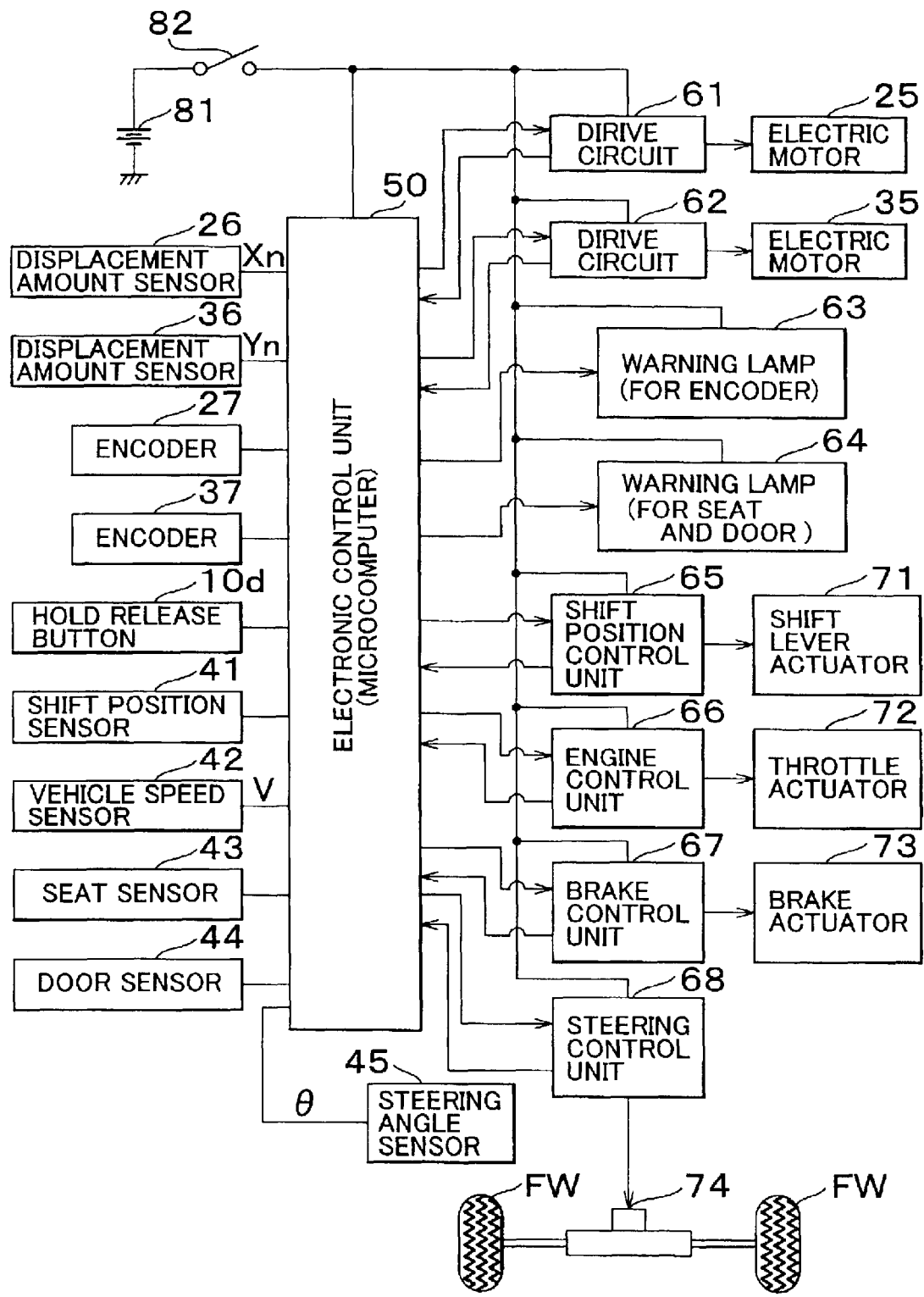
FIG. 3 is a block diagram showing an electronic control portion of the device for operating a vehicle according to the exemplary embodiment of the invention.

Next, an electronic control portion of the device for operating a vehicle of this vehicle will be explained with reference to FIG. 3. The electronic control portion is provided with a shift position sensor 41, a vehicle speed sensor 42, a seat sensor 43, a door sensor 44, and a steering angle sensor 45, in addition to the displacement amount sensors 26 and 36, the encoders 27 and 37, and the hold release button 10d.

The shift position sensor 41 detects a position of a shift lever of a transmission and outputs a shift position signal indicative of that position. The vehicle speed sensor 42 detects a vehicle speed V and outputs a vehicle speed signal indicative of that vehicle speed. The seat sensor 43, which is provided on a driver's seat, detects whether a driver is seated in the driver's seat and outputs a seat signal indicative of those detection results. The door sensor 44, which is provided on each of the vehicle doors, detects whether each door is open or closed and outputs door signals indicative of those detection results. The steering angle sensor 45 detects a steering angle θ of the steered left and right wheels (the left and right front wheels in this embodiment) FW and FW, and outputs a steering angle signal indicative of that steering angle θ. The steering angle sensor 45 is set such that this steering angle θ becomes "0" when the left and right wheels FW and FW are in the neutral position (aligned substantially parallel in the forward-backward direction of the vehicle), increases by a positive value when the left and right wheels FW and FW are turned to the right, and decreases by a negative value (the absolute value increases) when the left and right wheels FW and FW are turned to the left.

Each of these sensors 10d, 26, 27, 36, 37, and 41 through 45 are connected to an electronic control unit 50. This electronic control unit 50, which includes a microcomputer that includes a CPU, ROM, RAM, an interface and the like, inputs various signals from each of the sensors, and controls drive circuits 61 and 62, warning lamps 63 and 64, a shift position control unit 65, an engine control unit 66, a brake control unit 67, and a steering control unit 68 by performing an initial setting process, not shown, as well as the programs shown in FIGS. 4 through 7. In addition, the electronic control unit 50 also receives signals indicating abnormalities, as well as the completion of the initial setting process and the like from each of the sensors 10d, 26, 27, 36, 37, 41 through 45, the drive circuits 61 and 62, the warning lamps 63 and 64, and each of various control units 65 through 68.

The drive circuits 61 and 62 control the driving of the electric motor 25 of the forward-backward reaction force generating mechanism 20 and the electric motor 35 of the left-right reaction force generating mechanism 30, respectively. The warning lamp 63 is used to provide warning of an abnormality of the encoders 27 and 37, and the warning lamp 64 is used provide a warning with respect to whether the driver is seated and the door is open or closed. The shift position control unit 65 controls a shift lever actuator 71 for prohibiting the shift lever from shifting from the park position to another position. The engine control unit 66 controls a throttle actuator 72 for controlling a throttle opening. In particular, in this exemplary embodiment, the throttle actuator 72 is used to control acceleration (accelerator control) of the vehicle.

The brake control unit 67 controls a brake actuator 73 which applies a braking force to the vehicle. The steering control unit 68 controls the driving of an electric motor 74 which serves as an actuator for steering the left and right wheels FW and FW. The electric motor 74, which is incorporated into a steering mechanism for steering the left and right wheels FW and FW, turns the left and right wheels FW and FW left and right by driving the steering mechanism according to the direction of its rotation. The shift position control unit 65, the engine control unit 66, the brake control unit 67, and the steering control unit 68 all utilize separate microcomputers having a CPU, ROM, RAM, an interface and the like as their main component part, and perform an initial setting program, not shown, while controlling each actuator 71 through 74 according to various control program processes, not shown.

In addition, electric power from a battery 81 is supplied via an ignition switch 82 to the electronic control unit 50, the drive circuits 61 and 62, the warning lamps 63 and 64, and each of the various control units 65 through 68. Electric power from the battery 81 is also supplied when necessary via the ignition switch 82 to each of the various sensors 10d, 26, 27, 36, 37, and 41 through 45.

Next, the operation of the exemplary embodiment as constructed above will be described with reference to the flowcharts in FIGS. 4 through 7. When the ignition switch 82 is turned ON after the driver is seated in the driver's seat, electric power from the battery 81 is supplied to various circuits, including the electronic control unit 50, the shift position control unit 65, the engine control unit 66, the brake control unit 67, and the steering control unit 68. When supplied with the electric power, these control units 50 and 65 through 68 each perform an initial setting process program, not shown, in preparation to perform their various control programs. These control units 50 and 65 through 68 also each perform initial setting processes for various variables, RAM, and interfaces and the like used in performing the various control programs in preparation to perform various control operations, after which the various control programs are each performed. The electronic control unit 50 then begins to repeatedly perform the main program in FIG. 4 at short, predetermined intervals of time.

This main program begins with Step 100 and in Step 102 it is determined whether the initial setting complete flag ITF is "0". The initial setting complete flag ITF is initially set to "0" and becomes "1" to indicate the completion of the initial setting process, to be described later. Therefore, when the determination in Step 102 is "YES", i.e., when the initial setting complete flag ITF is "0", the routine proceeds on to Steps 104 through 108.

In Step 104, a shift position signal is input to the electronic control unit 50 from the shift position sensor 41 and it is determined whether the shift lever is in the park position. When the shift lever is in the park position, the determination in Step 104 is "YES" and the routine proceeds to Step 106. In Step 106, the current displacement amounts Xn and Yn of the operating lever 10 are input to the electronic control unit 50 from the displacement amount sensors 26 and 36 and the steering angle θ is input to the electronic control unit 50 from the steering angle sensor 45. The electric motors 25 and 35 are each driven, controlled based on these displacement amounts Xn and Yn and the steering angle θ, so as to set the forward-backward position and left-right position of the operating lever 10 to the initial position.

Figure 8:
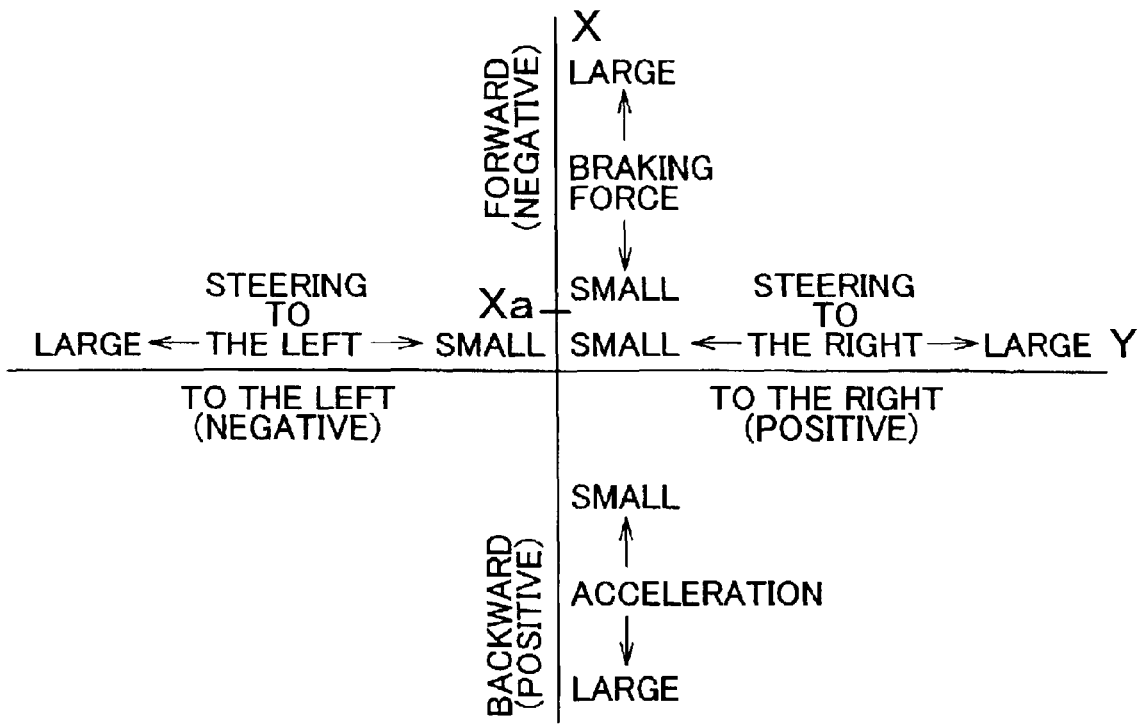
FIG. 8 is a graph showing operation modes of the vehicle as they correspond to the direction of displacement of the operating lever of the operating lever device according to the exemplary embodiment of the invention.

In this case, the relationship between the displacement position of the operating lever 10 and the operation of the vehicle will be described with reference to FIG. 8. The operating lever 10 is such that, in the forward-backward direction (direction X) of the vehicle body, the rate of acceleration of the vehicle increases as the operating lever 10 is displaced backward past the neutral position, and the braking force of the vehicle increases as the operating lever 10 is displaced forward past the neutral position. As described above, the displacement amount Xn detected by the displacement amount sensor 26 is "0" when the operating lever 10 is in the neutral position. This displacement amount Xn decreases negatively (an absolute value of the negative value increases) as the operating lever 10 is displaced forward, and increases positively as the operating lever 10 is displaced backward. Further, the operating lever 10 is such that, in the left-right direction (direction Y) of the vehicle body, the steering angle of the left and right wheels FW and FW increases to the right as the operating lever 10 is displaced to the right past the neutral position, and the steering angle of the left and right wheels FW and FW increases to the left as the operating lever 10 is displaced to the left past the neutral position. As described above, the displacement amount Yn detected by the displacement amount sensor 36 is "0" when the operating lever 10 is in the neutral position. This displacement amount Yn increases positively as the operating lever 10 is displaced to the right, and decreases negatively (an absolute value of the negative value increases) as the operating lever 10 is displaced to the left.

Returning back to the description of the main program, the initial position of the operating lever 10 is a position in which the operating lever 10 is slightly forward of the neutral position in the forward-backward direction (corresponding to a predetermined negative initial displacement amount Xa which is relatively close to "0"). The reason for this is so that a slight braking force is applied to the vehicle so that the vehicle does not take off before the driver begins to operate the operating lever 10 in this position. Further, the initial position of the operating lever 10 in the left-right direction is a position in which the displacement of the operating lever 10 corresponds to the steering angle θ of the left and right wheels FW and FW. The reason for this is so that the starting position of the operating lever 10 from which it will be moved by the driver corresponds to the steering angle θ of the left and right wheels FW and FW.

Accordingly, to set the operating lever 10 to the initial position in the forward-backward direction, the electric motor 25 is driven such that the current displacement amount Xn as detected by the displacement amount sensor 26 becomes equal to the initial displacement amount Xa. This initial displacement amount Xa, which will be described in detail later on, is a variable that is initially set to a predetermined value Xao. To set the operating lever 10 to the initial position in the left-right direction, the electric motor 35 is driven such that the current displacement amount Yn as detected by the displacement amount sensor 36 becomes equal to the displacement amount corresponding to the steering angle θ as detected by the steering angle sensor 45. To return the operating lever 10 to its initial position in the forward-backward and left-right directions, the operating lever 10 is slowly displaced in the forward-backward and left-right directions with respect to the vehicle body by slowly rotating the electric motors 25 and 35. In this case, this process in Step 106 is performed at short, predetermined intervals of time. Therefore, rotation signals indicative of the rotation of the electric motors 25 and 35 are sent from the encoders 27 and 37 to the electronic control unit 50 each time the process in Step 106 is performed. The electronic control unit 50 then uses these rotation signals to generate a rotation control signal which is output to the drive circuits 61 and 62 to make the electric motors 25 and 35 rotate at extremely small, predetermined angles. As a result, the drive circuits 61 and 62 make the electric motors 25 and 35 rotate at a slow speed so as to gradually displace the operating lever 10 to its initial position.

Also in Step 106, the various sensors 10d, 26, 27, 36, 37, and 41 through 45, the drive circuits 61 and 62, and the warning lamps 63 and 64 are checked for abnormalities. Completion of the initial setting processes of the various control units 65 through 68 is also checked in Step 106. In the abnormality check of the various sensors 10d, 26, 27, 36, 37, and 41 through 45, the drive circuits 61 and 62, and the warning lamps 63 and 64, for example, the various sensors 10d, 26, 27, 36, 37, and 41 through 45, the drive circuits 61 and 62, and the warning lamps 63 and 64 are checked for disconnections and shorts and the like. Also, a completion signal of the initial setting process is output from the various control units 65 through 68 by an initial setting process program, not shown, in each of the various control units 65 through 68.

After the process in Step 106, a determination process is performed in Step 108 to determine whether the initial process is complete. This determination process begins with Step 200 and ends with Step 210, as is illustrated in detail in FIG. 5. In Step 202, the displacement amount Xn which denotes the position of the operating lever 10 in direction X (the position in the forward-backward direction) is input to the electronic control unit 50 from the displacement amount sensor 26 and it is determined whether that displacement amount Xn is equal to the initial displacement amount Xa. In Step 204, the displacement amount Yn which denotes the position of the operating lever 10 in direction Y (the position in the left-right direction) is input from the displacement amount sensor 36 and the steering angle θ is input to the electronic control unit 50 from the steering angle sensor 45, and it is determined whether that displacement amount Yn is equal to the displacement amount that corresponds to the steering angle θ. In Step 206, it is determined whether an encoder normal flag EOK, set according to a process to be described later, is "1". An encoder normal flag EOK of "1" indicates that the encoders 27 and 37 are functioning normally. Then in Step 208, it is determined whether each of the sensors 10d, 26, 27, 36, 37, 41 through 45, the drive circuits 61 and 62, and the warning lamps 63 and 64 are functioning normally, according to the results of the abnormality check. In Step 210, it is determined whether all of the completion signals of the initial setting process have finished being input to the electronic control unit 50 from each of the various control units 65 through 68.

Figure 5:
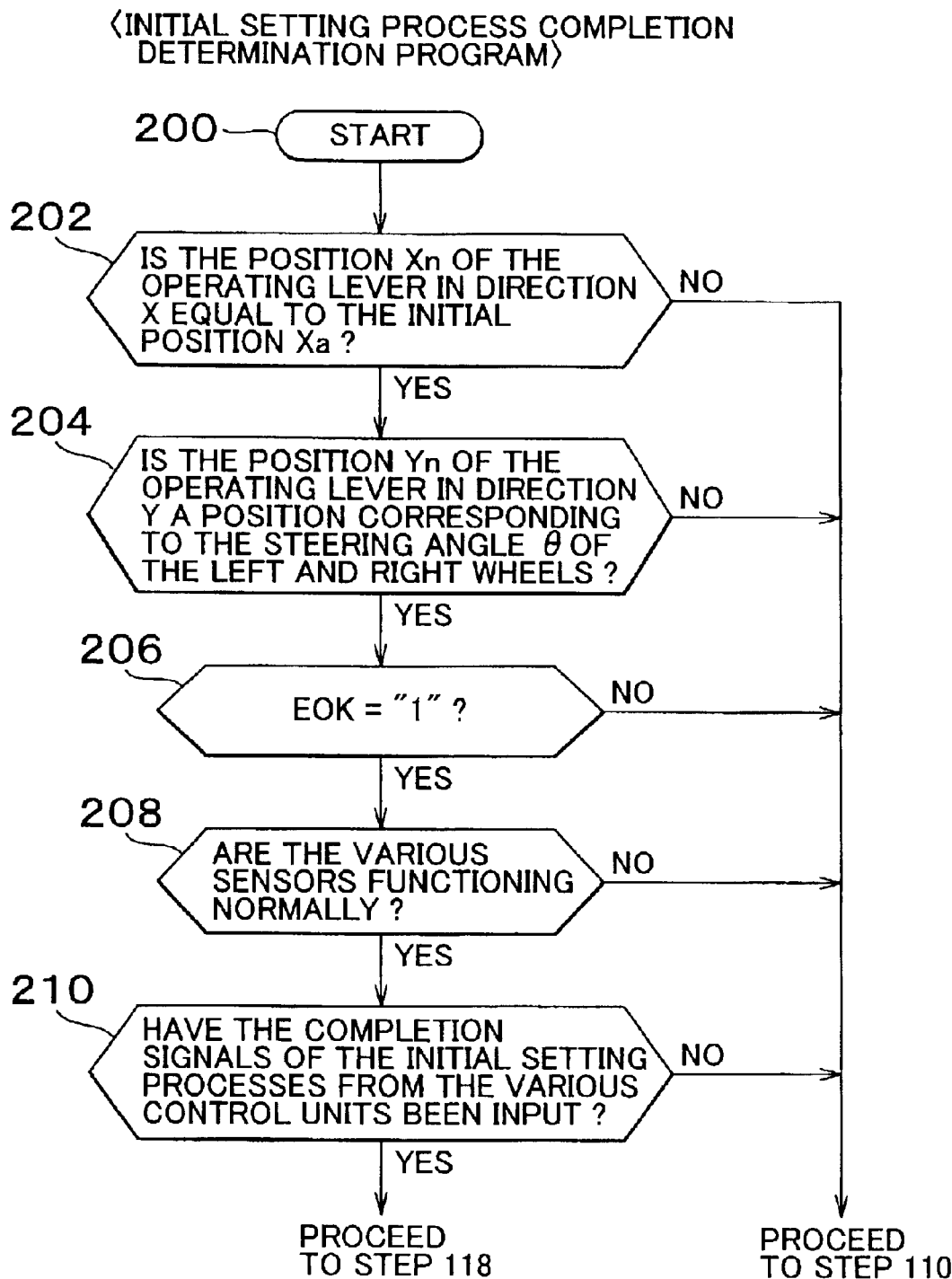
FIG. 5 is a flowchart showing an initial setting process completion determination routine in FIG. 4 in detail.
Figure 6:
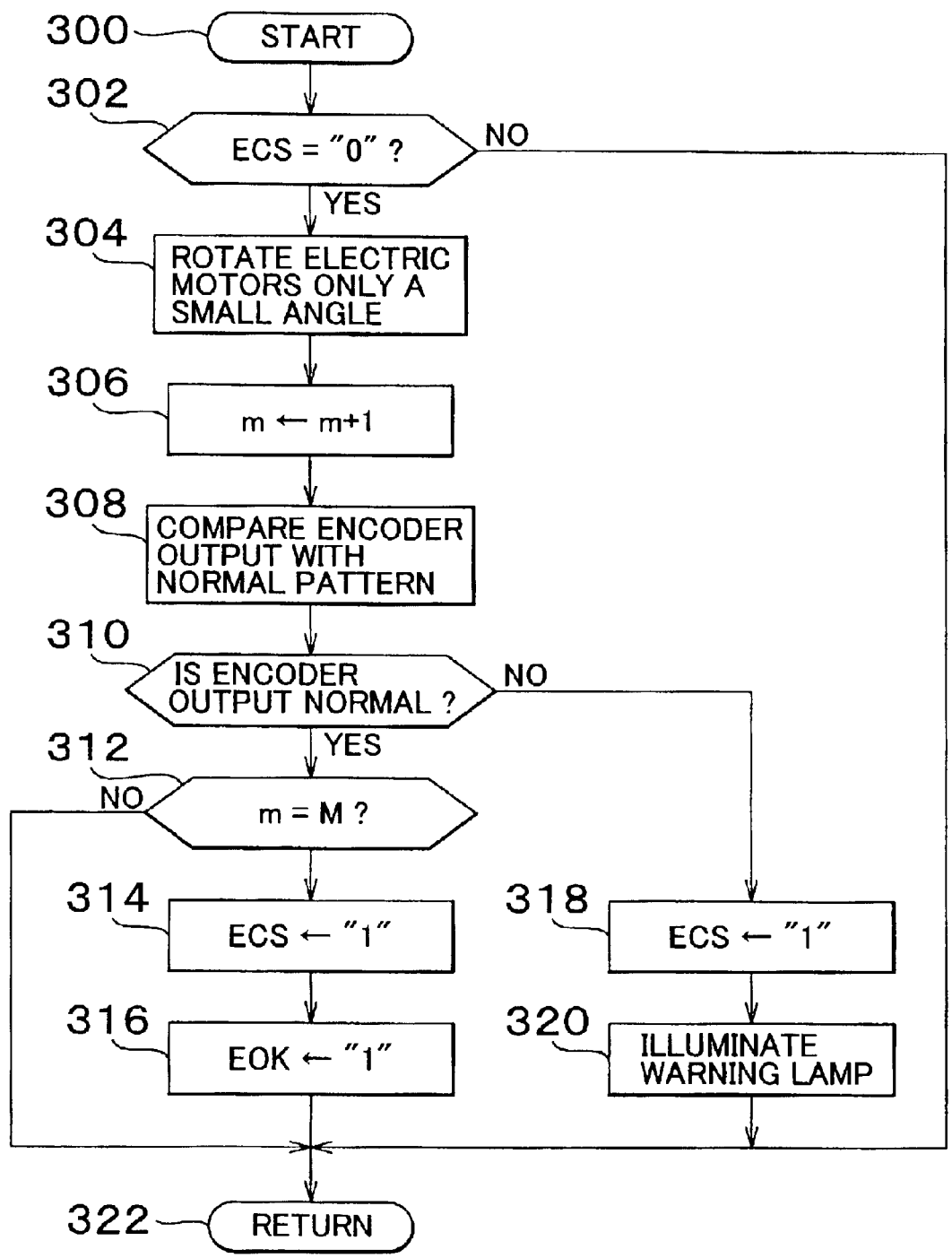
FIG. 6 is a flowchart showing an encoder check routine in FIG. 4 in detail.
Figure 7:
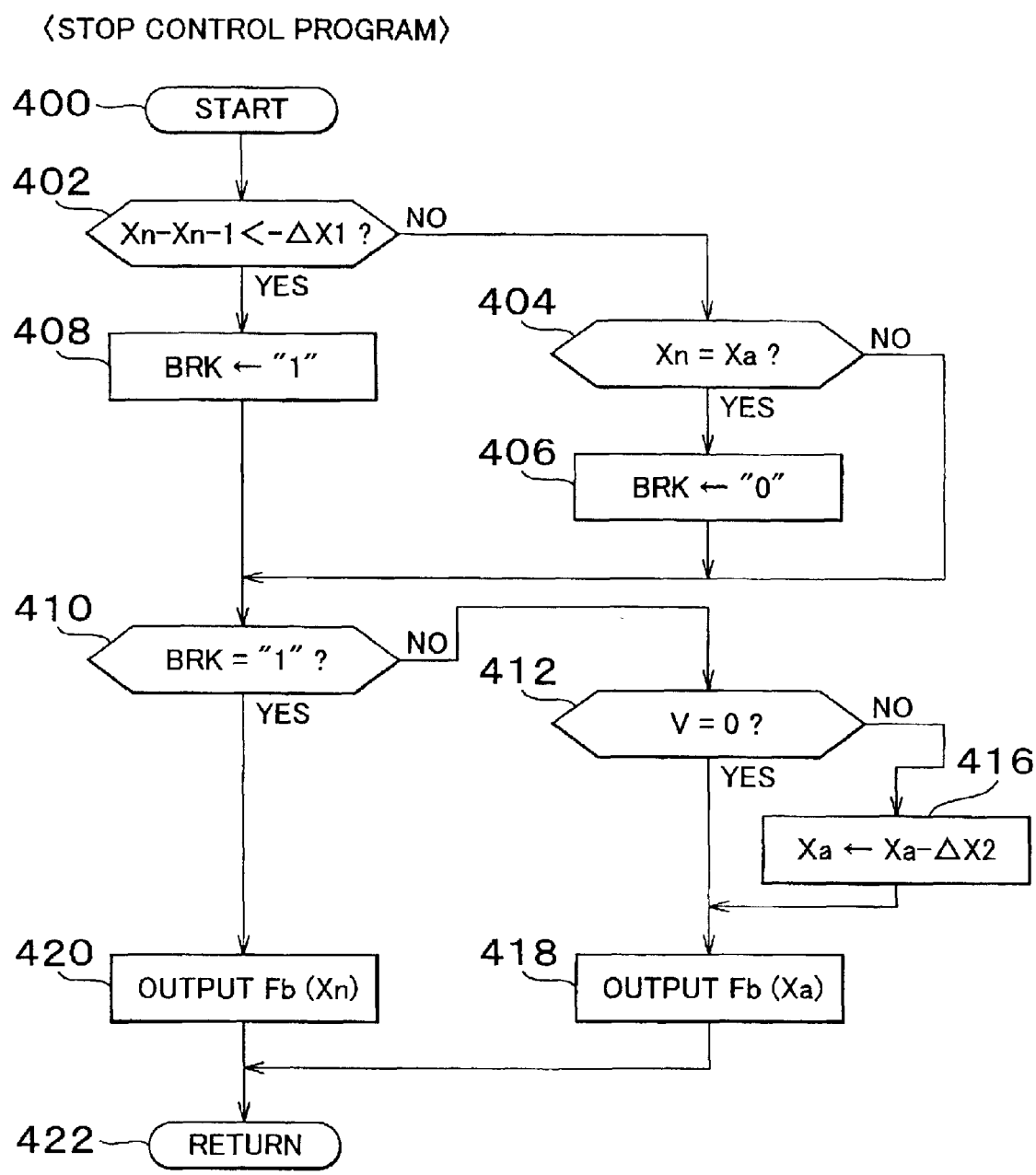
FIG. 7 is a flowchart showing a stop control routine in FIG. 4 in detail.

Unless all of the determination processes in Steps 202 through 210 in FIG. 5 are "YES", the determination in Step 108 is "NO" and the processes in Steps 110 through 116 continue to be performed. In Step 110, the shift lever is prevented from being shifted into any other position from the park position. That is, the electronic control unit 50 outputs a control signal to the shift position control unit 65 indicating that the shift lever is prohibited from being shifted. The shift position control unit 65 then controls the shift lever actuator 71 to prevent the shift lever from being shifted from the park position into another position.

Also, in Step 112, the throttle for supplying fuel to the engine is controlled to be fully closed. That is, the electronic control unit 50 outputs a control signal to the engine control unit 66 to fully close the throttle, and the engine control unit 66 then controls the throttle actuator 72 so as to keep the throttle in a fully closed state. According to these processes in Steps 110 and 112, the shift lever is maintained in the park position and the throttle is kept fully closed so that the vehicle will not accelerate (acceleration control) until it has been determined in Step 108 that the initial setting process is complete.

After the processes in Steps 110 and 112, an encoder check routine is performed in Step 114, and a stop control routine is performed in Step 116.

The encoder check routine in Step 114 rotates the electric motors 25 and 35 and detects any abnormalities in the encoders 27 and 37. The encoder check routine begins at Step 300, as is illustrated in detail in FIG. 6. After this encoder check routine begins, it is determined in Step 302 whether an encoder check complete flag ECS is at "0". This encoder check complete flag ECS is initially set to "0" and becomes "1" to indicate completion of the abnormality detection of the encoders 27 and 37. Accordingly, the determination in Step 302 is at first "YES" so the routine proceeds to Step 304 and the steps thereafter.

In Step 304 the electric motors 25 and 35 are rotated only a very small rotation angle. That is, the electronic control unit 50 outputs control signals to the drive circuits 61 and 62 to rotate both the electric motors 25 and 35 only a very small angle such that the drive circuits 61 and 62 rotate both the electric motors 25 and 35 only a very small angle. When the electric motors 25 and 35 are rotated, the rotation control of the electric motors 25 and 35 in the initial setting process of Step 106 in FIG. 4 temporarily pauses. Alternatively, the rotation control in Step 304 and the rotation control according to the initial setting process in Step 106 can be performed in conjunction with each other and rotation control that rotates the both the electric motors 25 and 35 at very small angles in order to return the operating lever 10 to its initial position can be used in place of rotation control of the electric motors 25 and 35 according to only the process in Step 304.

Next, "1" is added to a variable m in Step 306. This variable m is a variable for rotating the electric motors 25 and 35 each only a predetermined angle (e.g., one rotation). This variable m is initially set to "0" and increases by "1" each time rotation control in Step 304 is performed to rotate both the electric motors 25 and 35 a small angle. Next in Step 308, rotation signals (signals of consecutively generated pulses) output from both of the encoders 27 and 37 are input to the electronic control unit 50, where they are compared with a signal indicative of a normal rotation pattern. Than in Step 310 it is determined whether both of the rotation signals from the encoders 27 and 37 are normal. In this case, if the encoders 27 and 37 are functioning normally, the low and high levels of the signals of consecutively generated pulses, which are the rotation signals, should repeat on a predetermined fixed cycle because the rotation of the electric motors 25 and 35 in Step 304 is performed regularly. When there is a disturbance in the cycle of the low and high levels of the signals of consecutively generated pulses at a specific rotational position of the encoders 27 and 37, however, it is determined that there is an abnormality in the encoders 27 and 37.

Unless there is a disturbance in the cycle of the low and high levels of the rotation signals from both the encoders 27 and 37, the determination in Step 310 is "YES". It is then determined in Step 312 whether the variable m is equal to a predetermined value M. This predetermined value M determines whether the rotation of the electric motors 25 and 35 according to the process in Step 304 has reached a predetermined angle. When the predetermined angle is made $\phi o$ (e.g., $2\pi$) and the small angle in Step 304 is made $\Delta\phi$, the relationship of the predetermined value M to these is $\phi o = M \times \Delta\phi$. Unless the variable m from the rotation control of the electric motors 25 and 35 in Step 304 reaches the predetermined value M soon, the determination in Step 312 is "NO" and the encoder check routine ends in Step 322.

In repeatedly performing the encoder check routine in this way at predetermined intervals of time, when there is no disturbance in the cycle of the low and high levels of the rotation signals from the encoders 27 and 37 such that the determination in Step 310 continues to be "YES", the variable m increases by "1" each time the encoder check routine is performed. Then when the electric motors 25 and 35 are each rotated only a predetermined angle (e.g., $2\pi$), the variable m reaches the predetermined value M. When the variable m reaches the predetermined variable M, the determination in Step 312 is "YES" and the routine proceeds on to Step 314 and Step 316. In Step 314 the encoder check complete flag ECS is set to "1" and in Step 316 the encoder normal flag EOK is set to "1". The encoder check routine then ends in Step 322.

When the encoder check complete flag ECS is set to "1" in this way, even if the encoder check routine is performed again, the determination in Step 302 is "NO". As a result, the processes from Step 304 through 320 are not performed and the encoder check complete flag ECS and the encoder normal flag EOK are kept at "1".

On the other hand, when there is a disturbance in the rotation signals from the encoders 27 and 37, as described above, and an abnormality is discovered in the rotation signal from at least one of the encoders 27 and 37, the determination in Step 310 is "NO", and the routine proceeds on to Steps 318 and 320. In Step 318, the encoder check complete flag ECS is set to "1" and in Step 320 the warning lamp 64 for the encoders 27 and 37 illuminates. The encoder check routine then ends in Step 322. In this case, the encoder normal flag EOK is kept at "0".

When an abnormality is detected in at least one of the encoders 27 and 37 in this way, the warning lamp 64 illuminates, thus indicating to the driver that there is an abnormality in either the encoder 27 or the encoder 37. Also, because abnormality detection of the encoders 27 and 37 is done by actually rotating the electric motors 25 and 35 in this way, the abnormality detection is able to be done accurately. Then, because the abnormality detection following actual rotation of the electric motors 25 and 35 is performed during the initial setting process, i.e., prior to operating the vehicle using the operating lever 10, even if the electric motors 25 and 35 are rotated, it has no affect on the operation of the operating lever 10 by the driver so the time during the initial setting process is able to be used effectively.

Next, the stop control routine of Step 116 in FIG. 4 will be described. This stop control routine is a routine for stopping the vehicle automatically and in accordance with an operation of the operating lever 10 while the initial setting process in Step 106 is being performed. The stop control routine, which is described in detail in FIG. 7, begins with Step 400. After the stop control routine starts, in Step 402 the current displacement amount Xn of the operating lever 10 in direction X (forward-backward direction) is input to the electronic control unit 50 from the displacement amount sensor 26 and the most recent displacement amount Xn−1 of the operating lever 10 in direction X that was input from the displacement amount sensor 26 when the most recent stop control routine was performed is subtracted therefrom. It is then determined whether the difference Xn−Xn−1 is less than a negative predetermined value −ΔX1, an absolute value of which is small (Xn−Xn−1<−ΔX1). The determination process in this Step 402 is a process for detecting whether the driver has operated the operating lever 10 to the negative side in direction X (forward with respect to the vehicle body). Therefore, the absolute value ΔX1 of the predetermined value −ΔX1 is set to a value larger than the displacement amount that the operating lever 10 is displaced in direction X by one time through the processes in Step 106 in FIG. 4 and Step 304 in FIG. 6. As a result, the determination in Step 402 will not be "YES" even if the operating lever 10 is displaced by the processes in Steps 106 and 304.

Unless the driver operates the operating lever 10 now, the determination in Step 402 will be "NO", as described above. Then, in Step 404, it is determined whether the current displacement amount Xn that was input is equal to the initial displacement amount Xa. This initial displacement amount Xa changes according to the process in Step 416, to be described later, when the vehicle is stopped on a slope or the like and has moved before take off. Therefore, the initial displacement amount Xa is a variable that is initially set to a small negative predetermined value Xao, and after the vehicle takes off (i.e., when the vehicle speed V is equal to, or greater than, a predetermined vehicle speed), the initial displacement amount Xa is set to the predetermined value Xao according to a program process, not shown.

Figure 4A:
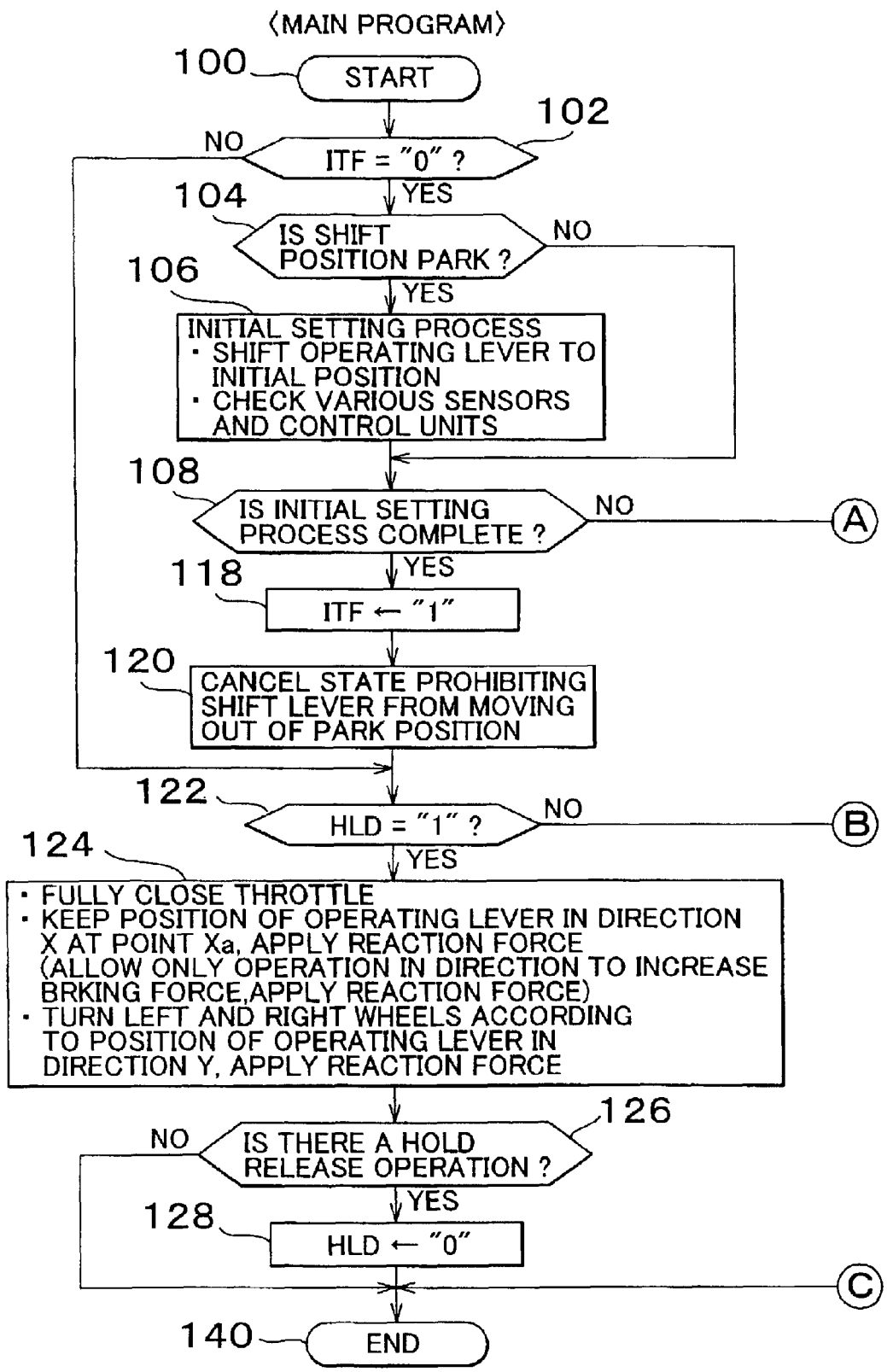
FIG. 4 is a flowchart showing a main program run by an electronic control unit shown in FIG. 3.
Figure 4B:
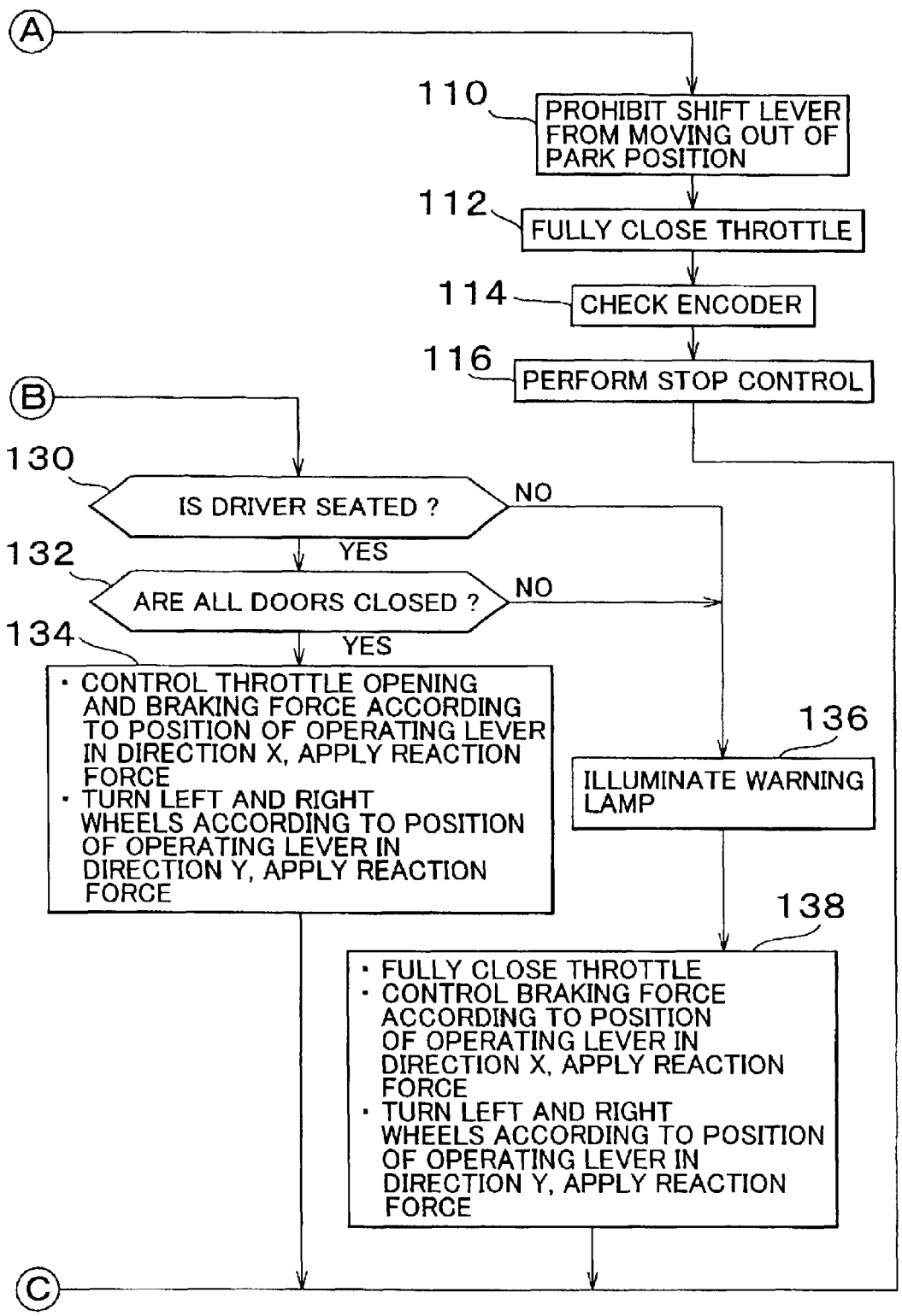

Unless the initial setting process in Step 106 in FIG. 4 is complete and the current displacement amount Xn is equal to the initial displacement amount Xa, the determination in Step 404 is "NO" and the routine proceeds on to Step 410, where it is determined whether a brake operation flag BRK is "1". The brake operation flag BRK is initially set to "0" and becomes "1" to indicate that an operation by the driver to apply braking force during the initial setting process is being detected. Therefore, because it is initially set to "0", the determination in Step 410 is "NO" and the routine proceeds on to Step 412.

Figure 9:
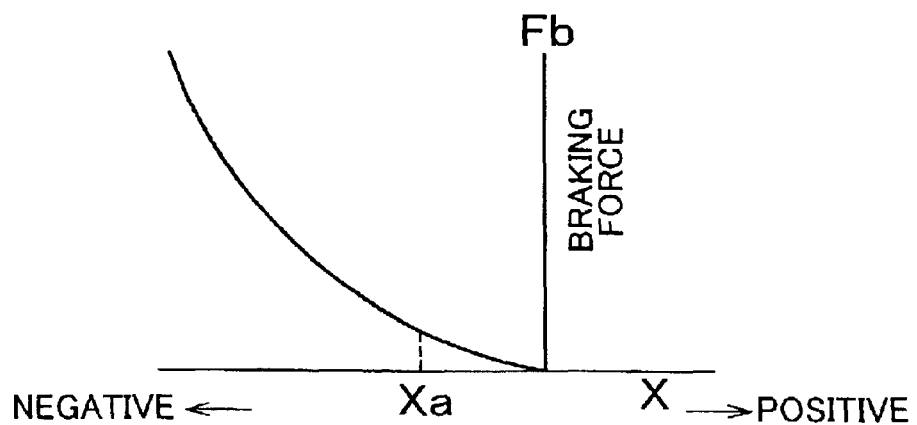
FIG. 9 is a braking force graph showing the relationship between a displacement amount of the operating lever of the operating lever device and a braking force according to the exemplary embodiment of the invention.

In Step 412, a vehicle speed signal indicative of the vehicle speed V is input to the electronic control unit 50 from the vehicle speed sensor 42, and it is determined whether this vehicle speed V is "0". If the vehicle speed V is "0" while the vehicle is stopped, the determination in Step 412 is "YES" and the routine proceeds on to Step 418. In Step 418, a braking force Fb (Xa) which corresponds to the initial displacement amount Xa is derived referring to a braking force table that is prerecorded in the electronic control unit 50 and read from a graph of braking force characteristics shown in FIG. 9. A control signal indicative of the braking force Fb (Xa) is then output to the brake control unit 67 and the stop control routine ends in Step 422. The brake control unit 67 then controls the brake actuator 73 to apply the braking force Fb (Xa) to the vehicle.

Therefore, during the initial setting process in Step 106, i.e., prior to operating the vehicle using the operating lever 10, the vehicle is stopped with relatively little braking force, regardless of the displacement position of the operating lever 10. As a result, the vehicle will not take off during the initial setting process, making it possible to ensure vehicle safety.

Next, a case in which the vehicle begins to move after it has stopped on a slope or the like even during the initial setting process will be described. In this case, the determination in Step 412 is "NO", i.e., it is determined that the vehicle speed V is not "0", so the routine proceeds on to Step 416. In Step 416, the initial displacement amount Xa is updated to a value Xa−ΔX2 in which only a small positive predetermined value ΔX2 is subtracted from the most recent initial displacement amount Xa. This positive predetermined value ΔX2 is set to a value that is smaller than the positive predetermined value ΔX1 used in Step 402. As a result, the initial displacement amount Xa is updated according to the process in Step 416, which in turn prevents the operation of the operating lever 10 by the driver from being detected in the determination process of Step 402 even if the operating lever 10 is displaced by the process of Step 106 in FIG. 4 described above.

Then, according to the process in Step 418, the braking force Fb (Xa) corresponding to the updated initial displacement amount Xa is applied to the vehicle. In this case, because the initial displacement amount Xa is updated to a negative value (a negative value with a large absolute value) that is smaller than the most recent value, the braking force Fb (Xa) currently applied to the vehicle will become larger than the most recent value. When the initial displacement amount Xa is updated, the operating lever 10 is set to the initial position corresponding with the updated initial displacement amount Xa by the initial setting process in Step 106 in FIG. 4.

As a result, when the vehicle stops and the vehicle speed V is "0", the determination in Step 412 is "YES" again and the braking force Fb (Xa) corresponding to the initial displacement amount Xa updated by the process in the most recent Step 416 continues to be applied to the vehicle by the process in Step 418. However, if the vehicle does not stop even when the braking force is increased, the determination in Step 412 is "NO" again and the initial displacement amount Xa in Step 416 is updated to an even smaller negative value than the last time and even greater braking force is applied by the process in Step 418. Therefore, in this case the braking force on the vehicle is gradually set larger. As a result, even if the vehicle starts to take off on a slope or the like, applying the braking force that increases in this way will always stop the vehicle, thus ensuring even better vehicle safety.

Next, a case will be described in which the driver operates the operating lever 10 in an attempt to stop the vehicle during the aforementioned type of initial setting process. In this case, a relationship comes about between the current displacement amount Xn of the operating lever 10 in direction X (the forward-backward direction) and the most recent displacement amount Xn−1 of the operating lever 10 in direction X, in which Xn−Xn−1<−ΔX. Therefore, the determination in Step 402 is "YES" and the brake operation flag BRK is set to "1" in Step 408, after which the routine proceeds to Step 410. By setting the brake operation flag BRK to "1" the determination in the determination process in the current Step 410 is "YES" and the routine proceeds to Step 420.

In Step 420, a braking force Fb (Xn) corresponding to the current displacement amount Xn input according to the process in Step 402 is derived by referencing the braking force table, and this braking force Fb (Xn) is applied to the vehicle. Accordingly, the vehicle is braked by this braking force Fb (Xn). In this way, even during the initial setting process, only operation of the operating lever 10 by the driver for braking the vehicle is allowed so that the vehicle is braked according to the operation of the operating lever 10 by the driver. Therefore, if the vehicle takes off during the initial setting process but the driver operates the operating lever 10 to brake the vehicle, the vehicle is braked by that operation, thus more accurately ensuring vehicle safety.

Also, immediately after the driver stops operating the operating lever 10 to brake the vehicle in this way, the brake operation flag BRK is kept at "1" so braking force in accordance with the current displacement amount Xn of the operating lever 10 is applied to the vehicle. Then, when the operating lever 10 is returned to its initial position which corresponds to the initial displacement amount Xa by the initial setting process in Step 106 in FIG. 4, the determination in Step 404 is "YES", i.e., it is determined that the current displacement amount Xn is equal to the initial displacement amount Xa, and the brake operation flag BRK is returned to "0" in Step 406. Accordingly, because the determination in Step 410 is "NO" such that the processes in Steps 412 through 418 are performed, the vehicle is automatically stopped again regardless of any operation of the operating lever 10 by the driver.

Returning to the description of the main program in FIG. 4 again, after performing the stop control routine in Step 116, the main program ends in Step 140. When the main program is performed again, after the processes in Steps 102 through 106, it is determined again in Step 108 that the initial setting process is complete. Then when all of the determinations are "YES" in Steps 202 through 210 in FIG. 5, the determination in Step 108 is "YES" and the routine proceeds on to Steps 118 and 120.

In Step 118 the initial setting complete flag ITF is changed to "1". In Step 120, a state (i.e., a locked state) in which the shift lever is prohibited from being shifted from the park position into another position is cancelled. That is, the electronic control unit 50 outputs a control signal to the shift position control unit 65 for canceling the locked state. The shift position control unit 65 then controls the shift lever actuator 71, permitting shifting from the parking position to another position. As a result, the driver is able to shift the shift lever into the drive or other position to prepare the vehicle for take off.

After the processes in Steps 118 and 120, it is determined in Step 122 whether a hold flag HLD is "1". The hold flag HLD is initially set to "1", which indicates that acceleration of the vehicle is prohibited (acceleration control). Therefore in this case, the determination in Step 122 is "YES" and the routine proceeds on to Step 124.

In Step 124, the following type of control is performed. First, the throttle is controlled to a fully closed state, as with the process in Step 112. As a result, the vehicle is prevented from taking off and maintained in a stopped state.

Also in Step 124, the operating lever 10, which is set to a value corresponding to the initial displacement amount Xa in the initial setting process, is maintained in a position corresponding to that initial displacement amount Xa. In this case, when the driver attempts to operate the operating lever 10 to the positive side in direction X (backward with respect to the vehicle body), the electric motor 25 is controlled via the drive circuit 61 according to the current displacement amount Xn from the displacement amount sensor 26 or the rotation signal from the encoder 27 to apply a reaction force to the operating lever 10 so that the operating lever 10 will not be displaced in that direction. Then a braking force in accordance with the initial displacement amount Xa is applied to the vehicle, just as is the case during the initial setting process. However, when the driver attempts to operate the operating lever 10 to the negative side in direction X (forward with respect to the vehicle body), it is allowed. In this case, the braking force Fb (Xn) in accordance with the current displacement amount Xn from the displacement amount sensor 26 is applied to the vehicle, just as with the process in Step 420 in FIG. 7. Also in this case, the electric motor 25 is controlled via the drive circuit 61 according to the displacement amount Xn to apply an appropriate reaction force that increases along with an increase in the absolute value |Xn| of the displacement amount Xn against a forward operation of the operating lever 10 by the driver. The rotation signal from the encoder 27 is also used to control the rotation of the electric motor 25 in order to apply this reaction force.

Also in Step 124, the left and right wheels FW and FW are steered in accordance with the displacement amount Yn in direction Y (the left-right direction with respect to the vehicle body) following an operation of the operating lever 10 by the driver. That is, the electronic control unit 50 inputs the current displacement amount Yn in direction Y from the displacement amount sensor 36 and calculates a target steering angle θ* for the left and right wheels corresponding to the displacement amount Yn that was input. This target steering angle θ* is set to "0" when the displacement amount Yn is "0", and is set to a value that increases by a positive value as the displacement amount Yn becomes larger in a positive region, and is set to a value that decreases by a negative value (the absolute value increases) as the displacement amount Yn becomes smaller in a negative region (the absolute value increases).

Then the detected steering angle θ of the left and right wheels FW and FW is input from the steering angle sensor 45 to the electronic control unit 50, which outputs a steering control signal indicative of a difference θ*−θ between the target steering angle θ* and the detected steering angle θ to the drive circuit 62. This drive circuit 62 then controls the rotation of the electric motor 35 in accordance with this steering control signal and steers the left and right wheels FW and FW so that the detected steering angle θ matches the target steering angle θ*. Accordingly, the left and right wheels FW and FW are steered left and right in accordance with operations of the operating lever 10 to the left and right by the driver, i.e., in accordance with the displacement amount Yn of the operating lever 10 to the left and right. Moreover, in this case, the electric motor 35 is controlled via the drive circuit 62 according to the displacement amount Yn to apply an appropriate reaction force that increases along with an increase in the absolute value |Yn| of the displacement amount Yn against a forward operation of the operating lever 10 by the driver. The rotation signal from the encoder 37 is also used to rotate the electric motor 35 in order to apply this reaction force.

After the process in Step 124, it is determined in Step 126 whether the hold release button 10d has been operated. After completion of the initial setting process in Step 106, unless the driver has operated the hold release button 10d, the determination in Step 126 is "NO" and the main program ends in Step 140. Accordingly, even if the initial setting process has been completed, unless the driver operates the hold release button 10d after completion of the initial setting, the hold flag HLD will be kept at "1" such that the determination in Step 122 is "YES" and the process in Step 124 will continue to be performed.

Therefore, in this case, the left and right wheels FW and FW are steered to the left and right by displacement of the operating lever 10 to the left and right while the vehicle is braked by the displacement of the operating lever 10 from the neutral position forward. The throttle, however is kept in a fully closed state and operation of the operating lever 10 is made ineffective from the neutral position backward (i.e., an acceleration operation) so the vehicle will not take off. As a result, during the initial setting process and prior to operation of the hold release button 10d, the control in Step 124 and the control in Steps 112 and 116 stop the vehicle and prevent it from accelerating such that unanticipated take off of the vehicle by the driver is prevented, thereby ensuring safety.

Although not shown in the flowchart in FIG. 4, when the vehicle is in this type of hold state, an automatic stop control process such as the process in Step 116 (the stop control routine in FIG. 7) may also be performed because the driver has not made the intention to make the vehicle take off. That is, even if the driver does not operate the operating lever 10 but the vehicle moves because it is on a slope, the initial displacement amount Xa may be automatically changed to a small value (an absolute value of the negative value is large) and the braking force Fb (Xa) increased such as in the processes in Steps 412, 416, and 418 in FIG. 7.

On the other hand, if the driver operates the hold release button 10d after completion of the initial setting process, the determination in Step 126 is "YES" and the hold flag HLD is changed to "0" in Step 128. As a result, the next time the main program is performed, the determination in Step 122 will be "NO", i.e., the hold flag HLD will be "0", and the routine will proceed on to Steps 130 and 132.

In Step 130, a seat signal is input to the electronic control unit 50 from the seat sensor 43 and it is determined whether the driver is seated in the driver's seat. In Step 132 the door signals are input to the electronic control unit 50 from the door sensor 44 and it is determined whether all of the doors of the vehicle are closed. When the driver is seated in the driver's seat and all of the doors of the vehicle are closed, the determinations in Steps 130 and 132 are both "YES" and a normal driving control process in Step 134 is performed.

In this normal driving control process, the vehicle is accelerated and braked in accordance with the displacement of the operating lever 10 in direction X (the forward-backward direction). That is, when the operating lever 10 is operated from the neutral position backward, the control signal is output to the engine control unit 66 based on the positive displacement amount Xn input from the displacement amount sensor 26 such that the throttle opening increases as that absolute value |Xn| increases. The engine control unit 66 drives the throttle actuator 72 in accordance with this control signal so as to set the throttle opening according to this control signal. As a result, the vehicle accelerates when the operating lever 10 is displaced from the neutral position backward and both take off and the running speed of the vehicle after take off are controlled by operation of the operating lever 10 by the driver. In this case as well, the electric motor 25 is controlled via the drive circuit 61 according to the displacement amount Xn that was input and the rotation signal from the encoder 27. Accordingly, an appropriate reaction force that increases according to an increase in the absolute value |Xn| of the displacement amount Xn is applied against the operation of the operating lever 10 backward by the driver.

Also, when the operating lever 10 is operated forward from its neutral position, the vehicle is braked based on the negative displacement amount Xn input from the displacement amount sensor 26 such that the braking force increases as that absolute value |Xn| increases, just as with the braking control in Step 124. Accordingly, the vehicle is braked by displacement of the operating lever 10 from the neutral position forward. Further, also in this case, an appropriate reaction force is applied against the operation of the operating lever 10 forward by the driver.

Moreover, when the operating lever 10 is operated in the left-right direction, the vehicle is steered correspondingly left and right according to the positive or negative displacement amount Yn input from the displacement amount sensor 36, just as with the brake control in Step 124. Also in this case, an appropriate reaction force is applied against the operation of the operating lever 10 left and right by the driver.

Meanwhile, if the driver is not seated in the driver's seat or if one of the vehicle doors is open, the determination in the corresponding step, Step 130 or Step 132, is "NO" and the routine proceeds on to Steps 136 and 138. In Step 136, the warning lamp 63 is illuminated to prompt the driver to sit in the driver's seat or to close the door.

In Step 138, among the forward-backward and left-right operation of the operating lever 10, only control with respect to operation backward differs. That is, operation of the operating lever 10 forward brakes the vehicle and operation of the operating lever 10 left and right turns the vehicle left and right. In contrast, even if the operating lever 10 is operated backward the vehicle does not accelerate. Instead, the throttle is set to the fully closed state such as that in the processes of Steps 112 and 124, so that acceleration of the vehicle is prohibited. Therefore, when the driver is not seated in the driver's seat or if any one of the doors of the vehicle is not closed or both, the vehicle is prohibited from both taking off and accelerating while running, which more accurately ensures safety during take off as well as running of the vehicle.

According to the foregoing exemplary embodiment, the displacement amount sensor 26 and displacement amount sensor 36 are provided which are used as rotation angle sensors for detecting the displacement amounts Xn and Yn of the operating lever 10. Furthermore, the encoders 27 and 37 are provided for detecting rotation of the electric motors 25 and 35. However, according to another exemplary embodiment, the rotational position of the electric motors 25 and 35, i.e., the displacement amounts Xn and Yn of the operating lever 10, may be calculated based on the rotational signals from the encoders 27 and 37, and acceleration control, braking control, and steering control of the vehicle may be performed based on those calculated displacement amounts Xn and Yn because of the reciprocal relationship between the rotational position of the electric motors 25 and 35 and the displacement amounts Xn and Yn of the operating lever 10. Accordingly, the encoders 27 and 37 are used as detecting means for detecting a displacement position of the operating lever 10, thus obviating the need for the displacement amount sensors 26 and 36. Also in this case, although not described above, reference position signals may be generated by the encoders 27 and 37 when the electric motors 25 and 35 are at a reference rotational position, and the rotational position of the electric motors 25 and 35, as well as the displacement amounts Xn and Yn of the operating lever 10 may be calculated based on those reference signals and the aforementioned two phase signal of consecutively generated pulses.

Further, according to the aforementioned exemplary embodiment, the displacement position corresponding to an arbitrary steering angle θ of the left and right wheels FW and FW is used as the initial position of the operating lever 10 in direction Y (in the left-right direction). According to another exemplary embodiment, however, the left and right wheels FW and FW may be returned to the neutral position, i.e., the steering angle θ may be returned to "0", upon completion of an operation to drive the vehicle, and the initial position may be such that the left and right wheels FW and FW are always in the neutral position (aligned substantially parallel in the forward-backward direction of the vehicle). In this case, when the ignition switch 82 is OFF, the steering angle θ as detected by the steering angle sensor 45 may be input to the electronic control unit 50 and the steering control unit 68 may be controlled so as to rotate the electric motor 74 to set the left and right wheels FW and FW in the neutral position, i.e., to set the steering angle to "0". In this case, even after the ignition switch 82 is OFF, electric power continues to be supplied to the electronic control unit 50, the steering control unit 68, and the displacement amount sensor 26 and the like. Also, in the initial setting process in Step 106 when the ignition switch 82 is ON, the rotation of the electric motor 35 may also be controlled so that the operating lever 10 is initially set to the neutral position in direction Y (in the left-right direction).

Further, according to the aforementioned exemplary embodiment, the electric motors 25 and 35 are rotated such that the operating lever 10 is automatically returned to its initial position by the initial setting process in Step 106. However, the invention can also be carried out in such a way that the operating lever 10 is not returned automatically, but is returned manually by the driver to the initial position. In this case as well, in the process for determining initial setting completion in Step 108, the processes in Steps 202 and 204 in FIG. 5 may be skipped and driving control of the vehicle by operation of the operating lever 10, i.e., the processes in Steps 118 and thereafter, may be performed after the driver has manually returned the operating lever 10 to its initial position. Also in this case, the driver may also be prompted visually or audibly to return the operating lever 10 to its initial position, as well as notified as to the direction in which the operating lever 10 should be operated.

Moreover, according to the aforementioned exemplary embodiment, the initial position of the operating lever 10 in direction X (in the forward-backward direction) is set to a position slightly farther forward than the neutral position (i.e., to a position in which the displacement amount Xn is negative) and a small braking force is applied to the vehicle before the vehicle starts to be operated by operation of the operating lever 10. According to another exemplary embodiment, however, because the shift lever is normally in the park position and a braking force from the parking brake is applied to the vehicle before the vehicle is operated by operation of the operating lever 10, the initial position may be set to the neutral position (i.e., a position in which the displacement amount Xn is "0") of the operating lever 10 in direction X (in the forward-backward direction). In this case, the initial displacement amount Xa may be set to "0" and the operating lever 10 may be displaced to a position corresponding to that initial displacement amount Xa which is set to "0" by rotating the electric motor 25 in the initial setting process in Step 106 in FIG. 4.

Accordingly, by performing the initial setting process completion determination routine in Step 108, the vehicle is prohibited from accelerating by the process in Step 112 to fully close the throttle until it is determined that the initial setting process of the operating lever 10 in direction X is complete, i.e., until the operating lever 10 has been initially set to the neutral position which is the starting point for acceleration. Therefore, according to this modified example, the driver is able to start operating the operating lever 10 from the neutral position, i.e., from a state in which the rate of acceleration and the braking force are both "0" for both acceleration control and braking control of the vehicle by operating the operating lever 10 in direction X (in the forward-backward direction).

Also according to the foregoing exemplary embodiment, the vehicle is prohibited from accelerating until the operating lever 10 is finished being set to its initial position by controlling the throttle to be fully closed in the process in Step 112. Instead of this, however, according to another exemplary embodiment, the throttle may be controlled to be fully closed so as to prohibit the vehicle from accelerating when the position of the operating lever 10 in direction X (in the forward-backward direction) is backward from the neutral position and the displacement amount Xn is positive, i.e., when the displacement position of the operating lever 10 is in an acceleration range, immediately before operation of the vehicle by operation of the operating lever 10, i.e., immediately after electric power has started being supplied. Then, acceleration may be allowed again when the operating lever 10 exceeds this acceleration range, in which displacement amount Xn>0, and is in the neutral position or a position farther forward than the neutral position, i.e., when the operating lever 10 has been displaced to a non-acceleration range, in which displacement amount Xn=0 or displacement amount Xn<0.

In this case, in the determination process in Step 202 in FIG. 5 in the initial setting routine in Step 108, the determination may be "YES" when it is detected that the operating lever 10 has entered the non-acceleration range. In this modified example as well, before the vehicle starts to be operated by operated the operating lever 10, the operating lever 10 may either be automatically displaced by driving the electric motor 25, as in the aforementioned exemplary embodiment, or the driver may displace the operating lever 10 manually as in the foregoing modified example. According to this modified example as well, the vehicle is able to be prevented from taking off against the wishes of the driver even if the operating lever 10 is backward from the neutral position (i.e., within the acceleration control region) before the vehicle starts to be operated.

Also according to the foregoing exemplary embodiment, in the determination processes of Steps 202 through 210 in the initial setting process completion determination routine in FIG. 5 (i.e., the determination process in Step 108 in FIG. 4), the locked state generated in the process in Step 112 is cancelled only when all of the determinations in Steps 202 through 210 are "YES", and the vehicle is accelerated according to displacement of the operating lever 10 backward by the processes in Steps 118 and thereafter (more specifically, by the process in Step 134). According to another exemplary embodiment, however, when the time necessary to return the operating lever 10 to its initial position in directions X and Y is shorter than the time necessary for the abnormality detection of the encoder, the abnormality detection of the various sensors, and the initial setting processes of the various control units (computer devices) 50 and 65 through 68, the operating lever 10 may be considered to have completely returned to its initial position when these initial setting processes are complete. Further, the locked state generated in the process in Step 112 may be cancelled, such that the vehicle is allowed to accelerate according to the displacement of the operating lever 10 backward as described above. In this case, the determination processes in Steps 202 and 204 may be eliminated from the plurality of determination processes of Steps 202 through 210. If all of the determinations in Steps 206 through 210 are "YES", the processes in Steps 118 and thereafter may then be performed. According to this modified example, the vehicle is able to be prevented from taking off against the wishes of the driver even if the operating lever 10 is backward from the neutral position before the vehicle starts to be operated.

Also, in setting in advance a time longer than that required for the operating lever 10 to return to its initial position in directions X and Y, abnormality detection of the encoders 27 and 37, abnormality detection of the various sensors and the like 26, 36, and 41 through 45, and the initial setting processes of the various control units (computer devices) 50 and 65 through 68, the operating lever 10 may be considered to have completely returned to its initial position after this predetermined period of time has passed from when the electric power started to be supplied. Further, the locked state generated in Step 112 may be cancelled such that the vehicle may be accelerated according to displacement of the operating lever 10 backward. In this case, a timer is provided for measuring the time that passes after the program in FIG. 4 begins, and instead of the process in Step 108, it may be determined in Step 108 whether the time measured by the timer in Step 108 exceeds the predetermined time. Until the measured time exceeds the predetermined time, the determination is "NO" and the processes in Steps 110 and thereafter may be performed. After the measured time has exceeded the predetermined time, the determination is "YES" and the processes in Steps 118 and thereafter may be performed. According to this modified example, the vehicle is able to be prevented from taking off against the wishes of the driver even if the operating lever 10 is backward from the neutral position before the vehicle starts to be operated.

Also, according to the foregoing exemplary embodiment, the vehicle is accelerated, braked, and steered by operating the operating lever 10 in the forward, backward, left, and right directions. According to another exemplary embodiment, however, other operation of the vehicle aside from these, such as gear-shifting or the like may also be performed. Also, vehicle acceleration, braking, and steering, may also each be controlled respectively by different operating members. For example, acceleration and braking of the vehicle may be controlled by the operating member 10 of the foregoing exemplary embodiment and a commonly used conventional rotating type steering wheel may be used as the operating member for steering.

The controllers (e.g., the electronic control unit 50 and control units 65-68) of the illustrated exemplary embodiments are implemented as one or more programmed general purpose computers. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations, which are exemplary, other combinations and configurations, including more less or only a single element, are also within the spirit and scope of the invention.

What is claimed is:

1. A device for operating a vehicle, comprising:
   an operating member that is displaceable with respect to the vehicle and operated by a driver to cause the vehicle to move; and
   a controller that controls an acceleration of the vehicle according to a displacement position of the operating member, causes the operating member to be displaced a predetermined initial position when electric power starts to be supplied thereto, and prohibits acceleration of the vehicle according to the displacement position of the operating member while the operating member is being displaced to the initial position until the operating member reaches a position which does not instruct the vehicle to accelerate.

2. The device for operating a vehicle according to claim 1, further comprising:
   an electric motor for applying a reaction force against an operation of the operating member by the driver, and for displacing the operating member; and
   a rotation sensor that detects a rotation of the electric motor and outputs a rotation signal indicative of the rotation to be used to control the rotation of the electric motor, wherein the controller checks for an abnormality of the rotation sensor by receiving the rotation signal output from the rotation sensor by rotating the electric motor while prohibiting acceleration of the vehicle.

3. The device for operating a vehicle according to claim 1, wherein the controller causes the vehicle to stop while acceleration of the vehicle is prohibited.

4. The device for operating a vehicle according to claim 1, wherein the controller causes the vehicle to be braked in accordance with an operation of the operating member, and causes the vehicle to be braked by operating the operating member while acceleration of the vehicle is prohibited by the controller.

5. The device for operating a vehicle according to claim 4, wherein the initial position of the operating member is set to a neutral position by the controller when electric power starts to be supplied thereto.

6. The device for operating a vehicle according to claim 4, wherein the initial position of the operating member is set by the controller to a position on a side of the neutral position that activates a slight brake when electric power starts to be supplied thereto.

7. The device for operating a vehicle according to claim 1, further comprising:
   a seat sensor that detects whether the driver of the vehicle is seated, wherein even if a state in which the vehicle is prohibited from accelerating is cancelled by the controller, acceleration of the vehicle according to an operation of the operating member by the controller is prohibited when the seat sensor does not detect that the driver is seated.

8. The device for operating a vehicle according to claim 1, further comprising:
a door sensor that detects whether a door of the vehicle is open or closed, wherein even if a state in which the vehicle is prohibited from accelerating is cancelled by the controller, acceleration of the vehicle according to an operation of the operating member by the controller is prohibited when the door sensor detects that the door is open.

9. A device for operating a vehicle, comprising:
an operating member that is displaceable with respect to the vehicle and operated by a driver; and
an controller that controls an acceleration of the vehicle according to a displacement position of the operating member, and prohibits acceleration of the vehicle according to the displacement position of the operating member when electric power starts to be supplied thereto until the operating member reaches a position which does not instruct the vehicle to accelerate.

10. The device for operating a vehicle according to claim 9, further comprising:
an electric motor for applying a reaction force against an operation of the operating member by the driver, and for displacing the operating member; and
a rotation sensor that detects a rotation of the electric motor and outputs a rotation signal indicative of the rotation to be used to control the rotation of the electric motor, wherein the controller checks for an abnormality of the rotation sensor by receiving the rotation signal output from the rotation sensor by rotating the electric motor while prohibiting acceleration of the vehicle.

11. The device for operating a vehicle according to claim 9, wherein the controller causes the vehicle to stop while acceleration of the vehicle is prohibited.

12. The device for operating a vehicle according to claim 9, wherein the controller causes the vehicle to be braked in accordance with an operation of the operating member, and causes the vehicle to be braked by operating the operating member while acceleration of the vehicle is prohibited by the controller.

13. The device for operating a vehicle according to claim 12, wherein an initial position of the operating member is set to a neutral position by the controller when electric power starts to be supplied thereto.

14. The device for operating a vehicle according to claim 12, wherein an initial position of the operating member is set by the controller to a position on a side of a neutral position that activates a slight brake when electric power starts to be supplied thereto.

15. The device for operating a vehicle according to claim 9, further comprising:
a seat sensor that detects whether the driver is seated in the vehicle, wherein even if a state in which the vehicle is prohibited from accelerating is cancelled by the controller, acceleration of the vehicle according to an operation of the operating member by the controller is prohibited when the seat sensor does not detect that the driver is seated.

16. The device for operating a vehicle according to claim 9, further comprising:
a door sensor that detects whether a door of the vehicle is open or closed, wherein even if a state in which the vehicle is prohibited from accelerating is cancelled by the controller, acceleration of the vehicle according to an operation of the operating member by the controller is prohibited when the door sensor detects that the door is open.

17. A device for operating a vehicle, comprising:
an operating member that is displaceable in a first direction and in a second direction with respect to the vehicle and operated by a driver;
a first position sensor that detects a displacement position of the operating member in the first direction;
a second position sensor that detects a displacement position of the operating member in the second direction; and
a controller that:
accelerates the vehicle according to the displacement position of the operating member in the first direction detected by the first position sensor,
steers a steered wheel according to the displacement position of the operating member in the second direction detected by the second position sensor,
determines whether the displacement positions of the operating member in the first and second directions detected by the first position sensor and the second position sensor, respectively, are respective predetermined initial positions, and
prohibits acceleration of the vehicle according to the displacement position of the operating member in the first direction until it is determined that the displacement positions of the operating member in the first and second directions are the respective predetermined initial positions.

18. The device for operating a vehicle according to claim 17, wherein the predetermined initial position of the operating member in the second direction is a position corresponding to a steering angle of a steered wheel in the second direction.

19. A device for operating a vehicle, comprising:
an operating member that is displaceable in a first direction and in a second direction with respect to the vehicle and operated by a driver;
a first position sensor that detects a displacement position of the operating member in the first direction;
a second position sensor that detects a displacement position of the operating member in the second direction; and
a controller that:
accelerates the vehicle according to the displacement position of the operating member in the first direction detected by the first position sensor,
steers a steered wheel according to the displacement position of the operating member in the second direction detected by the second position sensor,
displaces the operating member to a predetermined initial position when the vehicle starts to be operated, and
prohibits acceleration of the vehicle according to a displacement position of the operating member in the first direction until displacement of the operating member to the initial position is complete.

20. The device for operating a vehicle according to claim 19, wherein the predetermined initial position of the operating member is a position corresponding to a steering angle of the steered wheel in the second direction.

21. A method for operating a vehicle having an operating member that is displaceable with respect to the vehicle and operated by a driver, comprising:

controlling an acceleration of the vehicle according to a displacement position of the operating member;

displacing the operating member to a predetermined initial position when electric power starts to be supplied within the vehicle; and prohibiting acceleration of the vehicle according to the displacement position of the operating member while the operating member is being displaced to the initial position until the operating member reaches a position which does not instruct the vehicle to accelerate.

22. A method for operating a vehicle having an operating member that is displaceable with respect to the vehicle and operated by a driver, comprising:

controlling an acceleration of the vehicle according to a displacement position of the operating member; and prohibiting acceleration of the vehicle according to the displacement position of the operating member when electric power starts to be supplied thereto until the operating member reaches a position which does not instruct the vehicle to accelerate.

23. A method for operating a vehicle having an operating member that is displaceable in a first direction and in a second direction with respect to the vehicle and operated by a driver, a first position sensor that detects a displacement position of the operating member in the first direction and a second position sensor that detects a displacement position of the operating member in the second direction, comprising:

accelerating the vehicle according to the displacement position of the operating member in the first direction detected by the first position sensor;

steering a steered wheel according to the displacement position of the operating member in the second direction detected by the second position sensor;

determining whether the displacement positions of the operating member in the first and second directions detected by the first position sensor and the second position sensor, respectively, are respective predetermined initial positions; and prohibiting acceleration of the vehicle according to the displacement position of the operating member in the first direction until it is determined that the displacement positions of the operating member in the first and second directions are the respective predetermined initial positions.

24. A method for operating a vehicle having an operating member that is displaceable in a first direction and in a second direction with respect to the vehicle and operated by a driver, a first position sensor that detects a displacement position of the operating member in the first direction and a second position sensor that detects a displacement position of the operating member in the second direction, comprising:

accelerating the vehicle according to the displacement position of the operating member in the first direction detected by the first position sensor;

steering a steered wheel according to the displacement position of the operating member in the second direction detected by the second position sensor;

displacing the operating member to a predetermined initial position when the vehicle starts to be operated; and prohibiting acceleration of the vehicle according to a displacement position of the operating member in the first direction until displacement of the operating member to the initial position is complete.

* * * * *